United States Patent
Shimizu et al.

(10) Patent No.: US 7,913,816 B2
(45) Date of Patent: Mar. 29, 2011

(54) TRANSAXLE WITH BRAKE

(75) Inventors: Hiroaki Shimizu, Amagasaki (JP); Toshiyuki Hasegawa, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 871 days.

(21) Appl. No.: 11/483,552

(22) Filed: Jul. 11, 2006

(65) Prior Publication Data
US 2007/0026983 A1  Feb. 1, 2007

(30) Foreign Application Priority Data

Jul. 15, 2005 (JP) .................... 2005-206972
Jul. 15, 2005 (JP) .................... 2005-206973

(51) Int. Cl.
*F16H 57/04* (2010.01)

(52) U.S. Cl. ................... 184/6.12; 188/264 E

(58) Field of Classification Search .............. 188/264 B, 188/264 P, 264 D, 264 E, 264 F, 264 CC; 184/6.12, 11.1, 11.2, 11.3; 192/218
See application file for complete search history.

(56) References Cited

U.S. PATENT DOCUMENTS

| 1,928,301 | A | * | 9/1933 | Pierson | 192/113.36 |
| 2,069,571 | A | * | 2/1937 | Vaughan | 184/4 |
| 2,147,144 | A | * | 2/1939 | Carlson et al. | 184/11.1 |
| 2,147,145 | A | * | 2/1939 | Carlson et al. | 184/11.2 |
| 2,182,889 | A | * | 12/1939 | Carlson et al. | 184/11.1 |
| 2,608,275 | A | * | 8/1952 | Hobbs | 188/366 |
| 2,775,331 | A | * | 12/1956 | Peterson | 192/113.36 |
| 3,202,253 | A | * | 8/1965 | Bolster et al. | 192/113.36 |
| 3,261,440 | A | * | 7/1966 | Graham et al. | 192/113.23 |
| 3,448,635 | A | * | 6/1969 | Nelson | 475/160 |
| 3,762,503 | A | * | 10/1973 | Wilder et al. | 184/6.12 |
| 4,061,207 | A | * | 12/1977 | Ahlen | 188/264 E |
| 4,397,198 | A | * | 8/1983 | Borgersen et al. | 74/378 |
| 4,732,253 | A | * | 3/1988 | Hiramatsu et al. | 192/87.11 |
| 4,736,821 | A | * | 4/1988 | Ries | 188/71.6 |
| 5,148,903 | A | * | 9/1992 | Kobayashi et al. | 192/85.25 |
| 5,151,068 | A | * | 9/1992 | Mann et al. | 475/322 |
| 5,152,724 | A | * | 10/1992 | Scheiber et al. | 475/159 |
| 5,588,931 | A | * | 12/1996 | Forster | 475/338 |
| 6,182,800 | B1 | * | 2/2001 | Mochizuki et al. | 188/71.5 |

FOREIGN PATENT DOCUMENTS

JP  11-029013  2/1999

* cited by examiner

*Primary Examiner* — Robert A Siconolfi
*Assistant Examiner* — Stephen Bowes
(74) *Attorney, Agent, or Firm* — Sterne, Kessler, Goldstein & Fox, P.L.L.C.

(57) ABSTRACT

A transaxle has an axle, an input shaft drivingly connected to a prime mover and a brake disposed around the input shaft so as to brake the input shaft. A reduction drive train is drivingly interposed between the input shaft and the axle. The transaxle also has a reduction casing incorporating the reduction drive train and a lube sump provided in the reduction casing. A delivery opening is located at an outer peripheral side surface of the input shaft so as to deliver lube to the brake. The transaxle also has a brake lube passage provided in the input shaft so as to be connected to the delivery opening and lube introduction means for supplying lube from the lube sump to the brake lube passage.

4 Claims, 16 Drawing Sheets

TRANSAXLE WITH BRAKE

BACKGROUND OF THE INVENTION

1. Field of the Invention

The invention relates to a transaxle with a brake, for use in a vehicle, such as a buggy or all-terrain vehicle, which can travel on ground in bad condition, such as uncultivated land, grassland, sandy soil, a riverbed or pressed snow, regardless of such a bad ground condition. The invention especially relates to a device for cooling the brake of the transaxle.

2. Related Art

A vehicle, such as a buggy or all-terrain vehicle, travels by high-speed rotation of an axle receiving a high-speed input rotation. The vehicle is provided with a brake disposed around an input shaft for inputting the rotation force to the axle, and a rotatable friction member of the brake is relatively unrotatably fitted on the input shaft so as to be rotated integrally with the input shaft. During travel of the vehicle, the rotatable friction member rotates at high speed and agitates lube below it, and the lube resists the agitation so as to be heated. Additionally, an unrotatable friction member is relatively unrotatably fitted to an unrotatable portion such as a transaxle housing so as to be rotatable relative to the rotatable friction member and the input shaft, and during activation of the brake, the rotatable friction member is frictionally pressed against the unrotatable friction member so as to cause heat. Therefore, the vehicle requires a structure for efficiently cooling the brake.

Conventionally, as disclosed in Japanese Patent No. 3,052,075, there is a well-known lube circulation system comprising upper and lower lube passages interposed between a brake housing incorporating the brake and a reduction casing incorporating a reduction drive train. A rotating rotary component, e.g., a gear, of the reduction drive train agitates a lube sump in the reduction casing and splashes lube from the lube sump. A part of the splashed lube flows through the upper lube passage and enters an upper portion of the brake housing so as to cool the brake therein, and then, falls into a lower portion of the brake housing and returns to the lube sump in the reduction casing through the lower lube passage.

However, since the majority of lube splashed from the lube sump is hit against an inside wall surface of the reduction casing by a great centrifugal force and falls to return to the lube sump, the quantity of lube entering the brake housing through the upper lube passage is so small as to reduce the efficiency of cooling the brake.

To sufficiently cool the brake, the rotary component of the reduction drive train is required to be more deeply submerged into the lube sump so as to increase the splashed lube. However, the increase of depth of the rotary member submerged in the lube sump means rising of the lube level in the brake housing, so that, during traveling of the vehicle, the resistance of lube against the agitation by the rotating member of the brake is increased so as to increase power loss and heat.

An additional problem is large deviation of the brake cooling effect during travel of the vehicle on a rough land because the traveling vehicle is tilted so as to prevent evenness of the depth of the rotary component submerged in the lube sump.

SUMMARY OF THE INVENTION

A first object of the invention is to provide a transaxle provided with a brake which can be cooled stably and sufficiently. A second object of the invention is to provide the transaxle in which the brake saves power loss and heat caused by the resistance of agitated lube because the brake does not require its rotary component member to be deeply submerged into a lube sump for increasing the cooling effect. A third object of the invention is to provide the transaxle in which the brake is constantly and evenly cooled during traveling of a vehicle because the depth of its rotary component submerged in the lube sump is kept even while the vehicle travels on an uncultivated land.

To achieve the first object, a transaxle according to a first aspect of the invention comprises: an axle; an input shaft drivingly connected to a prime mover; a brake disposed around the input shaft so as to brake the input shaft; a reduction drive train interposed between the input shaft and the axle; a reduction casing incorporating the reduction drive train; a lube sump provided in the reduction casing; a delivery opening opened at an outer peripheral side surface of the input shaft so as to deliver lube to the brake; a brake lube passage provided in the input shaft so as to be connected to the delivery opening; and lube introduction means for supplying lube from the lube sump to the brake lube passage.

Therefore, lube in the brake lube passage is forcibly sprayed in radial directions from the center portion of the brake by a centrifugal force so as to cover all the components of the brake, i.e., sufficiently cool the brake.

In the first aspect, preferably, the transaxle further comprises: a brake housing incorporating the brake; and a vent hole connecting upper portions of the brake housing and the reduction casing to each other.

Therefore, air is exhausted from the brake housing into the reduction casing through the vent holes so as to prevent an increase of the air pressure in the brake housing, thereby smoothening the lube delivery from the delivery opening to the brake in the brake housing, and thereby enhancing the effect of cooling the brake.

In the first aspect, preferably, the transaxle further comprises: a rotary component member of the reduction drive train; a lube inlet opening opened at an end of the brake lube passage so as to face the rotary component member; and a scraper serving as the lube introduction means. The scraper is interposed between the lube inlet opening and the rotary component member so as to scrape lube stuck on an outer peripheral side surface of the rotating rotary component member and to introduce the scraped lube into the brake lube passage through the lube inlet opening.

Therefore, due to the effect of the scraper scraping lube on the rotary component member, it is ensured that the lube in the reduction casing is introduced into the brake lube passage.

Alternatively, in the first aspect, preferably, the transaxle further comprises an upwardly opened lube collection portion, serving as the lube introduction means, which is disposed in the reduction casing and opened to the lube inlet opening.

Lube splashed upward by a rotary component of the reduction drive train naturally falls so as to be collected into the upwardly opened lube collection portion. Therefore, the introduction of lube into the brake lube passage from the reduction casing can be simply ensured with no additional member, so as to reduce components and costs and facilitate maintenance.

To achieve the second and third objects, in the first aspect, preferably, the transaxle further comprises: a brake housing incorporating the brake; and a pump including a suction port and a delivery port. A lower space in the brake housing is opened to the lube sump in the reduction casing. The delivery port is opened to the brake lube passage, and the suction port is opened to the lower space in the brake housing, so that lube flowing into the lower space in the brake housing from the reduction casing is introduced into the brake lube passage by the pump.

Therefore, even if the quantity of lube in the brake housing is small, it is ensured that the brake lube passage will be supplied with lube by the pump, so that the brake is cooled stably and sufficiently even if the traveling vehicle is easily tilted so as to tilt the surface of the lube sumps in the reduction casing and the brake housing. Further, due to the pump, the lube surface of the lube sump in the reduction casing can be low so as to reduce a portion of the brake submerged in lube in the low space in the brake housing, thereby reducing power loss and heat caused by the resistance of the lube in the lower space of the brake housing against agitation by a high-speed rotating rotary component of the brake, e.g., a rotatable friction disk.

Further preferably, the transaxle further comprises delivery control means for limiting delivery of lube from the pump to the brake only during activation of the brake.

Therefore, while the brake is inactivated, the pump is kept stationary so as to prevent the lube delivery to the rotary component of the brake, e.g., the rotatable friction disk, which is rotated at high speed during traveling of the vehicle, thereby preventing power loss and heat caused by the resistance of the lube delivered from the pump against the agitation.

Further preferably, the transaxle further comprises a leak valve serving as the delivery control means. The leak valve is operatively connected to the brake. The leak valve is opened to drain lube from the pump so as to prevent lube from flowing from the delivery port of the pump to the brake lube passage when the brake is inactivated. The leak valve is closed so as to allow lube to flow from the delivery port of the pump to the brake lube passage when the brake is activated.

Therefore, the delivery control means for limiting delivery of lube from the pump to the brake only during activation of the brake is simplified, thereby saving manufacturing costs and facilitating maintenance.

To achieve the second object, a transaxle according to a second aspect of the invention comprises: an axle; an input shaft drivingly connected to a prime mover; a brake disposed around the input shaft so as to brake the input shaft; a reduction drive train drivingly interposed between the input shaft and the axle; a reduction casing incorporating the reduction drive train; a lube sump in the reduction casing; lube delivery means for delivering lube introduced from the lube sump to the brake so as to cool the brake; and delivery control means for limiting delivery of lube from the lube delivery means to the brake only during activation of the brake.

Therefore, the lube delivery means efficiently supplies the whole brake with lube so as to sufficiently cool the brake. Further, due to the lube delivery means, the lube surface of the lube sump in the reduction casing can be low so as to reduce a portion of the brake submerged in a lube sump in the brake housing, thereby reducing power loss and heat caused by the resistance of the lube in the brake housing against agitation by a high-speed rotating rotary component of the brake, e.g., a rotatable friction disk. Further, due to the delivery control means, during traveling of a vehicle with the inactivated brake, the delivery of lube is stopped so as to reduce power loss and heat caused by the resistance of lube permeating the high-speed rotating rotary component of the brake.

To achieve the third object, in the second aspect, preferably, the transaxle further comprises: a brake housing incorporating the brake; and an upwardly pumping pump serving as the lube delivery means. A lower space in the brake housing is opened to the lube sump in the reduction casing. The pump includes a suction port and a delivery port. The delivery port is opened above the brake, and the suction port is opened to the lower space in the brake housing, so that lube flowing into the lower space in the brake housing from the lube sump in the reduction casing is delivered from the delivery port of the pump to an upper portion of the brake.

Therefore, even if the quantity of lube in the brake housing is small, the upwardly pumping pump surely supplies lube to an upper portion of the brake, so as to stably cool the brake during its activation even if the vehicle is easily tilted so as to tilt the lube surfaces of the lube sumps.

Further preferably, the transaxle further comprises a leak valve operatively connected to the brake so as to serve as the delivery control means. The leak valve is opened to drain lube from the pump so as to prevent lube from flowing from the delivery port of the pump to the brake lube passage when the brake is inactivated, and the leak valve is closed so as to allow lube to flow from the delivery port of the pump to the brake lube passage when the brake is activated.

Therefore, the delivery control means for limiting delivery of lube from the pump to the brake only during activation of the brake is simplified, thereby saving manufacturing costs and facilitating maintenance.

Alternatively, preferably, in the second aspect, the transaxle further comprises: a brake housing incorporating the brake; a lube sump provided in the brake housing; and a horizontally pumping pump interposed between the brake housing and the reduction casing so as to serve as the lube delivery means. A lower portion of the brake is submerged in the lube sump in the brake housing. The pump supplies lube from the lube sump in the reduction casing to the lube sump in the brake housing so as to raise a level surface of the lube sump in the brake housing.

Therefore, during activation of the brake, any area of the rotary component of the brake rotating during travel of the vehicle, when reaching the lower portion of the brake, is sunk into the lube sump, and then, rises therefrom so as to spread the lube all over the rotary component, thereby ensuring a sufficient effect of cooling the brake. On the other hand, the brake is submerged at only the lower portion thereof in the lube sump, and due to the delivery control means, the rising of the surface of lube sump by the pump is limited only during the activation of the brake, i.e., the lube surface is lowered during inactivation of the brake so as to reduce the above-mentioned power loss and heat caused by the resistance of lube against the agitation.

Further preferably, the transaxle further comprises: a transmission drivingly interposed between the pump and the input shaft; and a clutch interposed between the transmission and the input shaft, and operatively connected to the brake, so as to serve as the delivery control means. The clutch is disengaged to isolate the pump from power of the input shaft when the brake is inactivated, and the clutch is engaged to transmit power of the input shaft to the pump when the brake is activated.

Therefore, during normal travel of a vehicle with the transaxle, the brake is inactivated and the clutch is disengaged, so that the input shaft is almost free from load caused by driving the horizontally pumping pump, thereby minimizing power loss caused by transmitting power for traveling of the vehicle.

These, further and other objects, features and advantages will appear more fully from the following description with reference to the accompanying drawings.

DETAILED DESCRIPTION OF THE INVENTION

Figure 1:
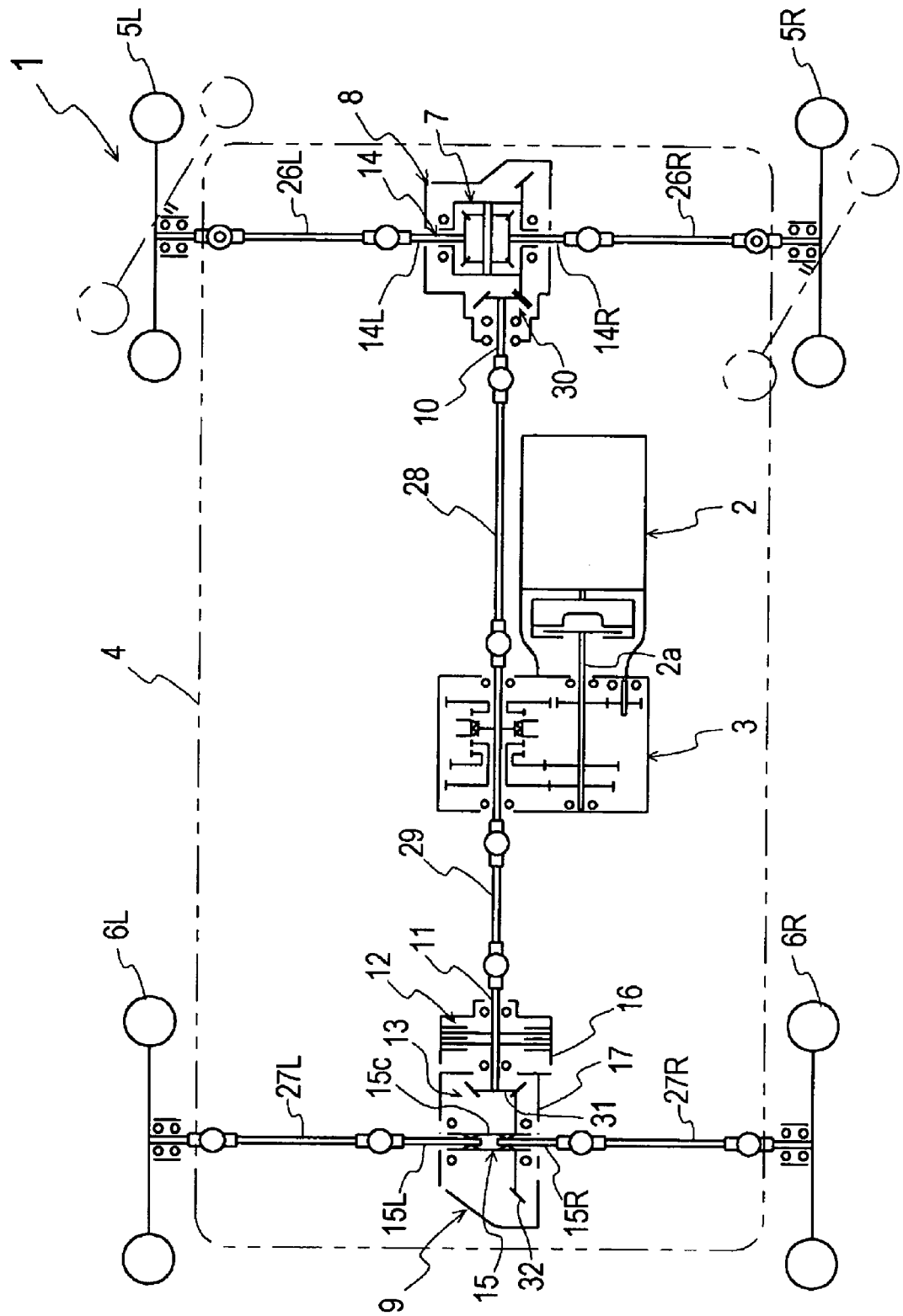
FIG. 1 is a schematic plan view of a vehicle, such as a buggy or all-terrain vehicle, equipped with a transaxle according to the present invention.

Referring to FIG. 1, a general structure of a vehicle 1, such as a buggy or all-terrain vehicle, will be described. Vehicle 1 is provided with a vehicle frame 4. A front transaxle 8 is mounted onto a front portion of vehicle frame 4. Left and right front axle-driving shafts 14L and 14R are extended leftward and rightward from front transaxle 8, so as to be drivingly connected at outer ends thereof to respective front axles 26L and 26R, onto which respective front wheels 5L and 5R are steerably supported. Front transaxle 8 incorporates a differential unit 7 and a reduction drive train 30. Left and right front axle-driving shafts 14L and 14R are differentially connected at proximal ends thereof to each other through differential unit 7. An input shaft 10 of reduction drive train 30 projects rearward from front transaxle 8.

An engine 2 is mounted on a fore-and-aft intermediate portion of vehicle frame 4. Engine 2 includes an output shaft 2a inserted into a center transmission 3 so as to distribute power between front and rear propeller shafts 28 and 29 extended forward and rearward from center transmission 3.

Front propeller shaft 28 is connected at a front end thereof to a rear end of input shaft 10, so as to transmit the output force from center transmission 3 to front transaxle 8, thereby driving steerable front wheels 5L and 5R by power of engine 2 through reduction drive train 30, differential unit 7, front axle-driving shafts 14L and 14R (referred to as a generic name "front axle-driving shaft 14") and front axles 26L and 26R.

A rear transaxle 9 is mounted onto a rear portion of vehicle frame 4. Left and right rear axle-driving shafts 15L and 15R are extended leftward and rightward from rear transaxle 9, so as to be drivingly connected at outer ends thereof to respective rear axles 27L and 27R, onto which respective rear wheels 6L and 6R are supported. In rear transaxle 9, left and right rear axle-driving shafts 15L and 15R are relatively unrotatably connected at proximal ends thereof to each other through a coaxial axle-connection sleeve 15c, thereby constituting an entire rear axle-driving shaft 15 between left and right rear axles 27L and 27R.

Rear transaxle 9 includes a front brake housing 16 and a rear reduction casing 17 integrally joined to each other. Lateral axle-connection sleeve 15c is journalled in reduction casing 17. A fore-and-aft input shaft 11 rotatably penetrates brake housing 16.

In brake housing 16, a brake 12 is provided around input shaft 11. Input shaft 11 is extended rearward into reduction casing 17 behind brake housing 16. A small bevel gear 31 is fixedly provided on the rear end of input shaft 11 in reduction casing 17, and a large bevel gear 32 is fixedly provided on axle-connection sleeve 15c so as to mesh with bevel gear 31, thereby constituting a reduction drive (gear) train 13 in reduction casing 17, as later detailed.

Input shaft 11 projects forward from brake housing 16 and is connected to rear propeller shaft 29, so as to transmit the output force from center transmission 3 to rear transaxle 9, thereby driving rear wheels 6L and 6R by power of engine 2 through reduction drive train 13, rear axle-driving shaft 15 and rear axles 27L and 27R. Input shaft 11 can be braked by brake 12 so as to stop rear wheels 6L and 6R.

Preferably, a universal joint couples the front end of input shaft 11 to the rear end of propeller shaft 29. The same can be said about each of couplings between an output shaft of center transmission 3 and propeller shaft 29, between the output shaft of center transmission 3 and front propeller shaft 28, and between propeller shaft 29 and input shaft 10. The same can be also said about couplings of respective axles 26L, 26R, 27L and 27R to respective axle-driving shafts 14 and 15 and to respective center axes of wheels 5L, 5R, 6L and 6R.

A first embodiment of transaxle 9 will now be described with reference to FIGS. 2 to 5. A main casing 33, constituting a main casing part of transaxle 9, includes a front portion 33a and a rear portion 33b. Rear portion 33b is opened at either a left or right side surface (a left side in this embodiment) as shown in FIG. 3, and side cover 34 is fastened to the side surface of rear portion 33b by bolts so as to cover the opening of rear portion 33b, so that mutually joined side cover 34 and rear portion 33b of main casing 33 constitutes reduction casing 17. Axle-connection sleeve 15c is journalled at left and right ends thereof by side cover 34 and rear portion 33b of main casing 33 through respective ball bearings 36 and 37.

Figure 2:
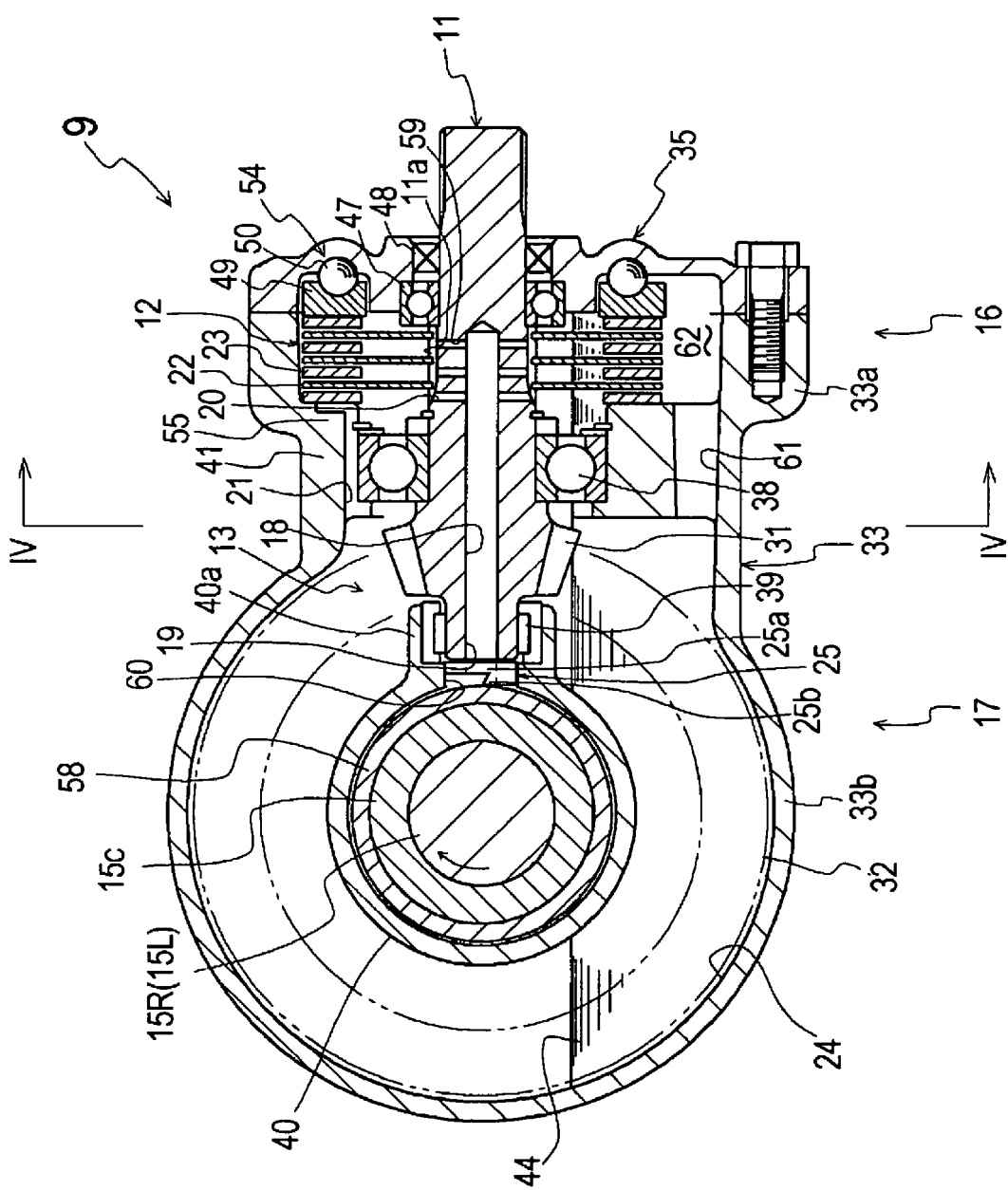
FIG. 2 is a sectional side view of a transaxle, serving as a rear transaxle for the vehicle of FIG. 1, according to a first embodiment of the invention.
Figure 3:
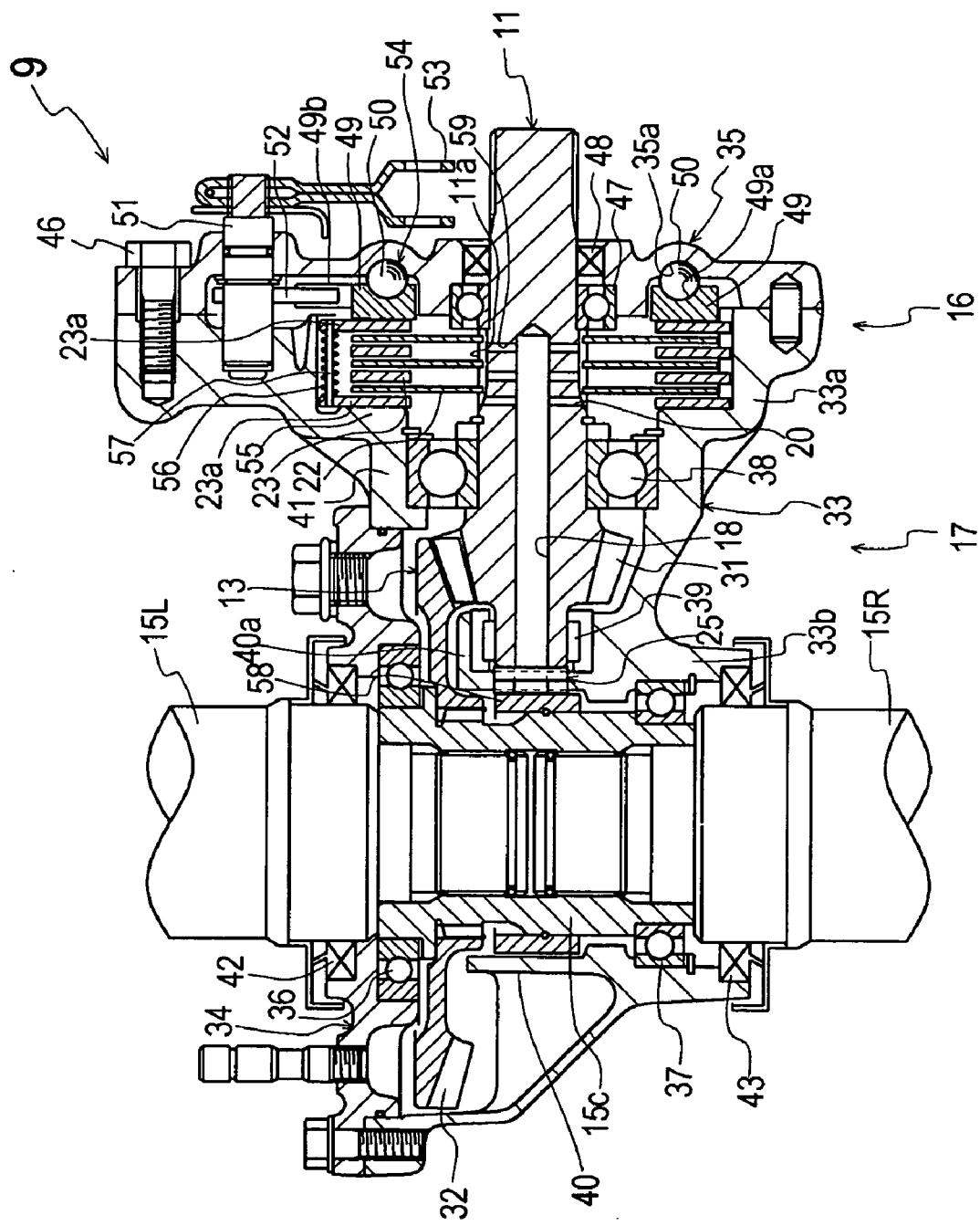
FIG. 3 is a sectional plan view of the transaxle of FIG. 2.

Main casing 33 is formed with a laterally axial cylindrical wall 40 surrounding axle-connection sleeve 15c, as shown in FIG. 2, and a part of cylindrical wall 40 is formed into a bearing wall 40a extended between front and rear portions 33a and 33b toward side cover 34 so as to journal the rear end of input shaft 11 through a needle bearing 39, as shown in FIGS. 2 and 3. Input shaft 11 is journalled at the fore-and-aft intermediate portion thereof through a ball bearing 38 by a fore-and-aft axial cylindrical wall 41 formed at the fore-and-aft intermediate portion of front portion 33a of main casing 33. A front end of front portion 33a is formed as a flange and opened forward, and a front cover 35 is fastened to the front surface of front portion 33a by bolts 46 so as to cover the front opening of front portion 33a, so that mutually joined front cover 35 and front portion 33a of main casing 33 constitute brake housing 16. Input shaft 11 is journalled at a front portion thereof by front cover 35 through a ball bearing 47.

In front portion 33a of main casing 33, input shaft 11 is peripherally formed with small bevel gear 31 between bearings 38 and 39. In rear portion 33b of main casing 33, large bevel gear 32 is fixed on axle-connection sleeve 15c and disposed along side cover 34. Large bevel gear 32 is passed at a front portion thereof through a gap between side cover 34 and bearing wall 40a so as to mesh with small bevel gear 31.

A lube seal 42 is interposed between left axle-driving shaft 15L and side cover 34 leftward from bearing 36, a lube seal 43 is interposed between right axle-driving shaft 15R and rear portion 33b of main casing 33 rightward from bearing 37, and a lube seal 48 is interposed between input shaft 11 and front cover 35 in front of bearing 47, thereby fluidly tightening the inside space of reduction casing 17 and brake housing 16 joined to each other. Lube 44 is filled into reduction casing 17 so as to serve as a lube sump 24 disposed at a lower space in reduction casing 17, and flows into a lower space in brake housing 16, thereby ensuring circulation of lube 44 between reduction casing 17 and brake housing 16 in rear transaxle 9. The lube surface of lube sump 24 is so high as to submerge a lower portion of large bevel gear 32 in lube sump 24.

Brake 12 configured in brake housing 16 includes multi rotatable friction disks 22, multi unrotatable friction rings 23, a pressure receiving portion 55 and a brake actuator 54. Multi rotatable friction disks 22 are axially slidably and relatively unrotatably spline-fitted onto a spline portion 11a of input shaft 11. Multi unrotatable friction rings 23 are axially slidably and relatively unrotatably fitted onto an inner peripheral wall surface of front portion 33a of main casing 33. Multi rotatable friction disks 22 and multi unrotatable friction rings 23 are alternately aligned. The rearmost unrotatable friction ring 23 faces to pressure receiving portion 55 which is a stepped portion formed of main casing 33. Brake actuator 54 is provided for pushing the foremost unrotatable friction ring 23 toward pressure receiving portion 55 (rearward) so as to press friction disks 22 and friction rings 23 against one another.

Brake actuator 54 includes an annular rotary cam plate 49 and balls 50. Cam plate 49 is disposed adjacent to the foremost unrotatable friction ring 23. Ball grooves 49a are formed on a front surface of cam plate 49, and ball grooves 35a are formed on a rear surface of front cover 35 so as to correspond to respective ball grooves 49a. Each of balls 50 is disposed in each couple of ball grooves 35a and 49a corresponding to each other. Ball grooves 35a and 49a are aligned in the peripheral direction of input shaft 11. Each of either ball grooves 35a or 49a is extended in the peripheral direction of input shaft 11 and gradually becomes shallower from one end thereof to the other end thereof. During rotation of rotary cam plate 49 in a predetermined direction, cam plate 49 with ball grooves 49a is guided by ball grooves 35a so as to slide on balls 50, so that cam plate 49 is moved rearward away from front cover 35 so as to push the foremost unrotatable friction ring 23 rearward, thereby pressing friction disks 22 and friction rings 23 against one another.

Rotary cam plate 49 is integrally formed with an arm 49b extended radially outward from the outer peripheral surface of rotary cam plate 49. A fore-and-aft extended brake operation shaft 51 is pivotally supported by front cover 35 and front portion 33a of main casing 33, and an arm 52 is fixed on brake operation shaft 51 in front cover 35 so as to be operatively coupled to arm 49b. Brake operation shaft 51 projects forward from front cover 35 so as to be fitted to a brake operation lever 53 linked to an unshown brake operation device disposed in a driver's section of vehicle 1 through a wire or another link member.

Each of unrotatable friction rings 23 is formed on the outer peripheral edge thereof with spline teeth to be fitted to the inner peripheral wall surface of front portion 33a of main casing 33. One or some spline teeth 23a of each of the foremost and rearmost friction rings 23 are used for slidably guiding a guide pin 57. In this regard, guide pin 57 is disposed in the fore-and-aft direction in parallel to input shaft 11, and slidably passed through opposite spline teeth 23a of foremost and rearmost friction rings 23. A release spring 56 is wound around guide pin 57 so as to be compressed between spline teeth 23a of foremost and rearmost friction rings 23.

When brake 12 is inactivated, each ball 50 reaches the deepest portion between each couple of grooves 49a and 35a so as to minimize the gap between rotary cam plate 49 and front cover 35, and the biasing force of release spring 56 maximizes the distance between foremost and rearmost friction rings 23 so as to separate alternately aligned friction disks 22 and rings 23 from one another, thereby allowing rotation of input shaft 11.

When the unshown brake operation device is operated for activating brake 12, brake operation lever 53 is rotated so as to rotate rotary cam plate 49 through arms 52 and 49b, whereby each ball 50 reaches the shallowest portion between each couple of grooves 49a and 35a so as to maximize the gap between rotary cam plate 49 and front cover 35, i.e., push rotary cam plate 49 backward against the biasing force of release spring 56, thereby pressing alternately aligned friction disks 22 and rings 23 against one another, and thereby causing friction force for braking rotated input shaft 11.

A structure for lubricating and cooling brake 12 shown in FIGS. 2 to 5 will be described. A pick-up collar 58 is fixed on an outer peripheral and lateral intermediate portion of axle-connection sleeve 15c. A brake lube passage 18 is bored within input shaft 11 along the axial centerline of input shaft 11. Brake lube passage 18 has an opened rear end, serving as a lube inlet opening 19, which faces to a front end of pick-up collar 58. A front end of brake lube passage 18 exists in the fore-and-aft intermediate portion of input shaft 11. A plurality of delivery lube passages 59 are extended radially outward from the front end portion of brake lube passage 18. Outer ends of respective delivery lube passages 59 are delivery openings 20 disposed at splined portion 11a which is formed on the outer peripheral surface of input shaft 11 so as to be spline-fitted to rotatable friction disks 22.

Figure 5:
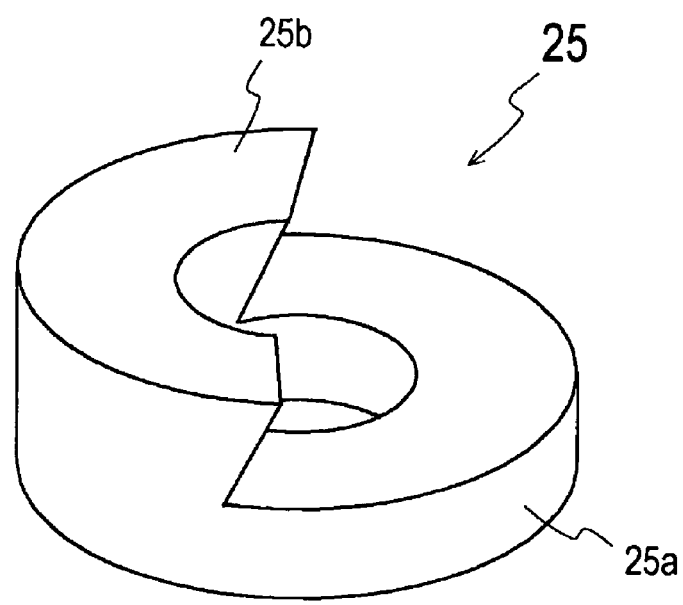
FIG. 5 is a perspective view of a scraper.

Bearing wall 40a is formed therein with a scraper chamber 60 between the front end of pick-up collar 58 and the rear end of input shaft 11 supported by needle bearing 39. A scraper 25 is fixedly fitted in scraper chamber 60. Scraper 25 is made of elastic material, e.g., rubber, and shaped so as to include a circularly cylindrical main portion 25a and a half-cut cylindrical elastic spatulate portion 25b axially projecting from an end of main portion 25a, as best shown in FIG. 5. Scraper 25 is disposed coaxially to input shaft 11 so as to upwardly face its half-cut space between main portion 25a and spatulate portion 25b, whereby spatulate portion 25b is disposed below the half-cut space and abuts at a rear end thereof against the front end of the outer peripheral surface of pick-up collar 58, and main portion 25a is disposed in front of spatulate portion 25b and abuts at a front end thereof against the rear end of input shaft 11 so as to open its inner space to lube inlet opening 19. A top edge of spatulate portion 25b is slanted forwardly downward to main portion 25a.

When rear axle-driving shaft 15 rotates for forward traveling of vehicle 1, as marked by an arrow in FIG. 2, pick-up collar 58 is rotated integrally with rear axle-driving shaft 15. During the rotation of pick-up collar 58, any portion of the outer peripheral surface of pick-up collar 58 repeats sinking into lube sump 24 and rising from the lube surface of lube sump 24, so as to carry lube 44 stuck thereon to the front end point of rotating pick-up collar 58. At the front end point of pick-up collar 58, lube 44 is scraped by spatulate portion 25b of scraper 25, flows forwardly downward along the slanted top edge of spatulate portion 25b, and flows into lube inlet opening 19 through the inner space of main portion 25a of scraper 25. Lube 44 further flows forward in brake lube passage 18, and is forcibly delivered radially from delivery openings 20 through radial delivery lube passages 59 by the centrifugal force of high-speed rotating input shaft 11. Consequently, the whole brake 12, including easily heated gap spaces between friction disks 22 and rings 23, is evenly permeated by lube 44 splashed radially from delivery openings 20 so as to be sufficiently cooled.

Figure 4:
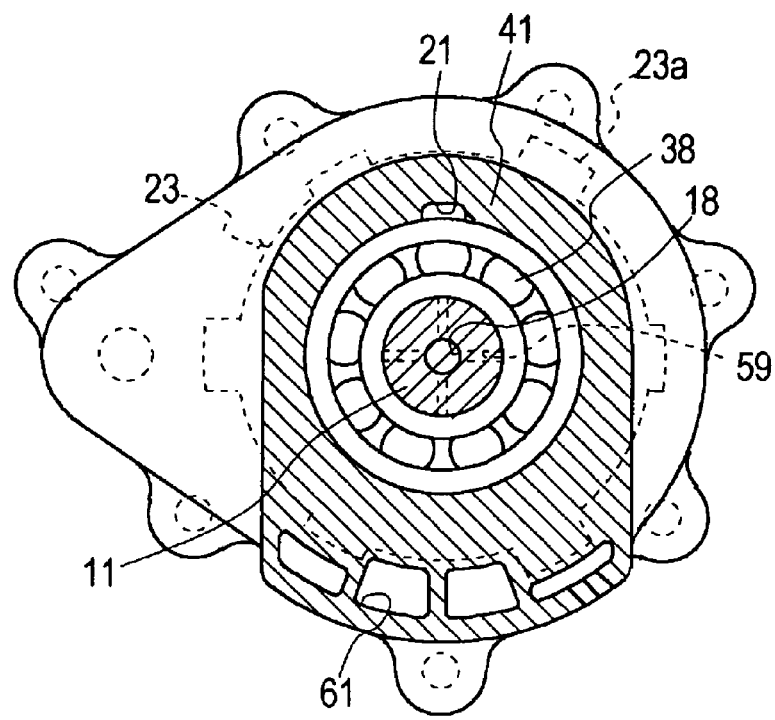
FIG. 4 is a cross sectional view taken along IV-IV line of FIG. 2.

Lube 44, after permeating brake 12, falls along the inside wall surface of brake housing 16, i.e., front cover 35 and front portion 33a of main casing 33. Brake housing 16 is provided therein with a lower space 62 formed by front cover 35 and front portion 33a of main casing 33, as shown in FIG. 2, so as to collect lube 44 falling along the inside wall surface of brake housing 16. As shown in FIGS. 2 and 4, a fore-and-aft connection lube passage 61 penetrates a lower portion of cylindrical wall 41 between lube sump 24 in reduction casing 17 and lower space 62 in brake housing 16, so that lube 44 collected in lower space 62 in brake housing 16 can return to lube sump 24 in reduction casing 17.

Further, to enhance the effect of cooling brake 12, as shown in FIGS. 2 and 4, a fore-and-aft vent hole 21 penetrates an upper portion of cylindrical wall 41 between reduction casing 17 and brake housing 16. When lube 44 is delivered from delivery openings 20 to brake 12, air having a volume as large as that of delivered lube 44 is smoothly exhausted through vent hole 21 into reduction casing 17, so as to prevent an increase of the air pressure in brake housing 16, thereby smoothening the delivery of lube 44 from delivery openings 20.

Figure 6:
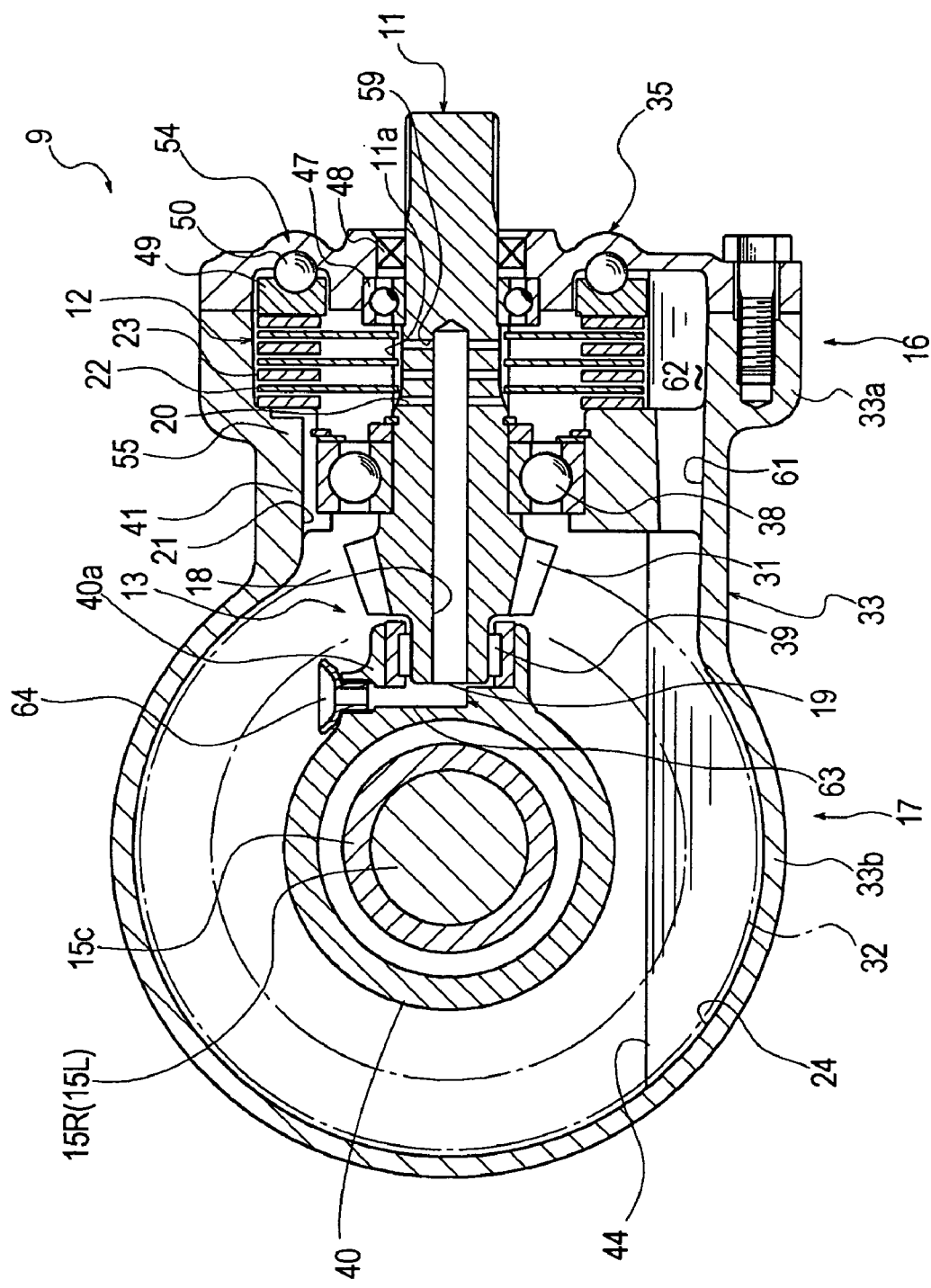
FIG. 6 is a sectional side view of a transaxle, serving as a rear transaxle for the vehicle of FIG. 1, according to a second embodiment of the invention.
Figure 7:
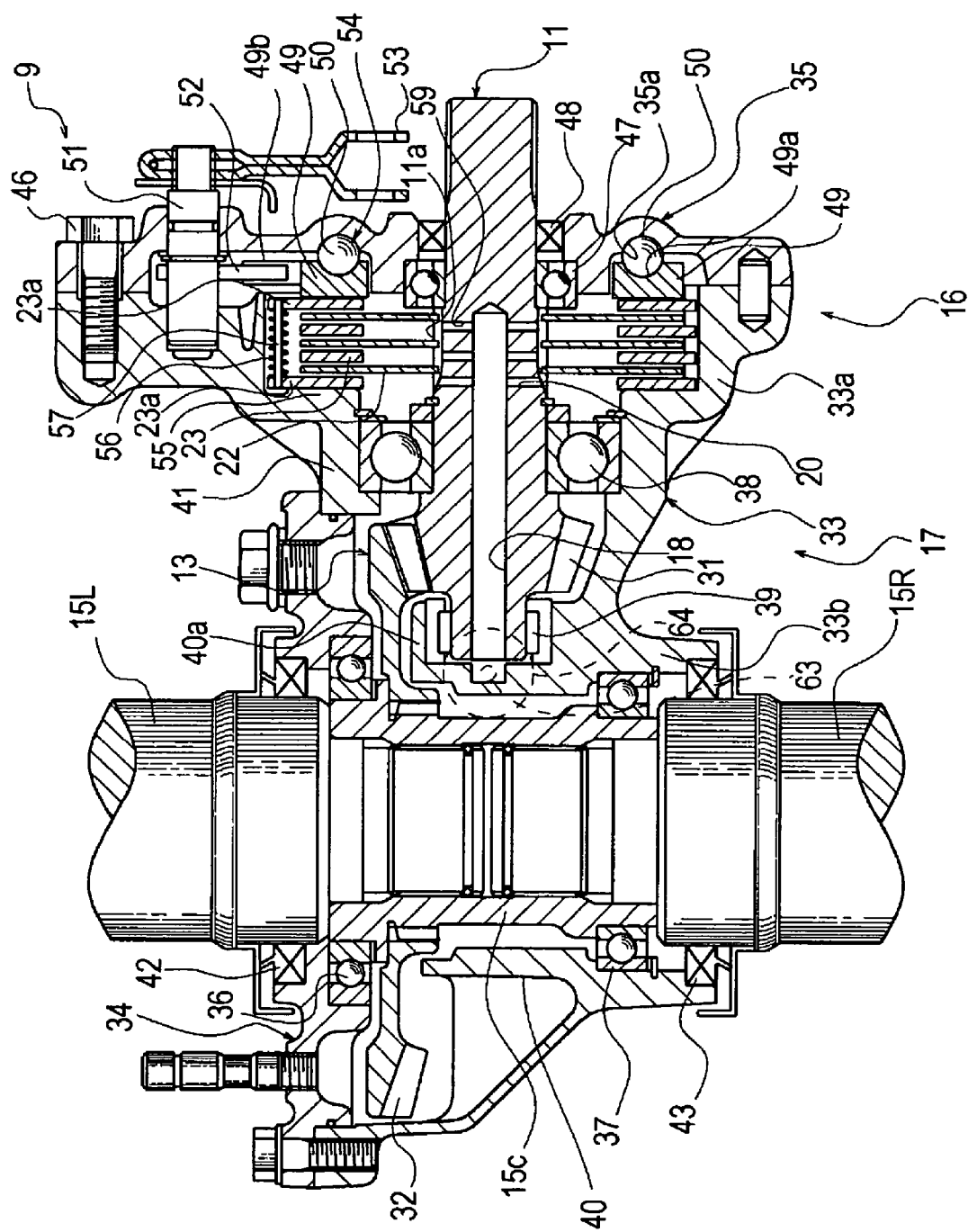
FIG. 7 is a sectional plan view of the transaxle of FIG. 6.
Figure 8:
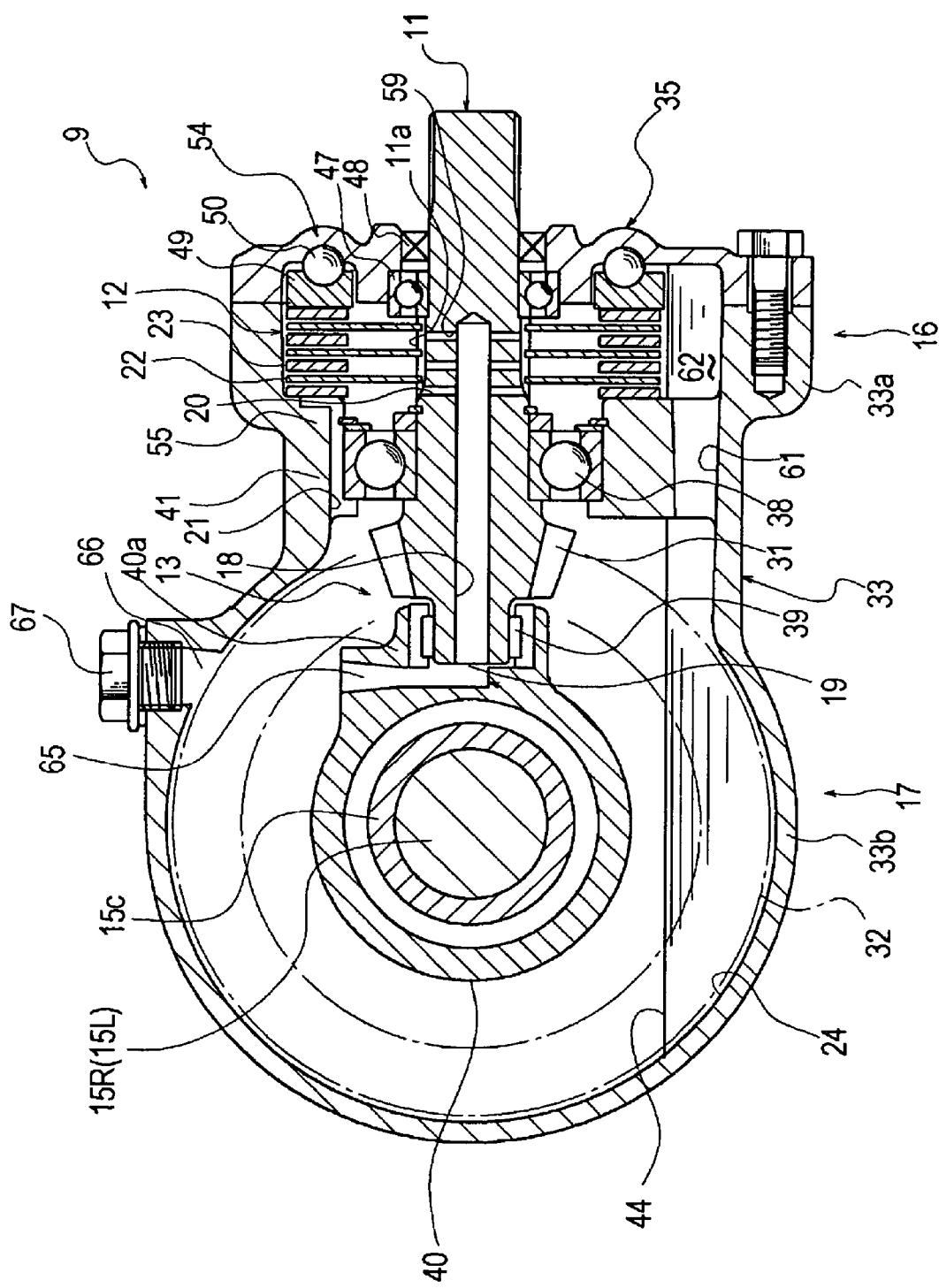
FIG. 8 is a sectional side view of a transaxle, serving as a rear transaxle for the vehicle of FIG. 1, according to a third embodiment of the invention.

A second embodiment of rear transaxle 9 shown in FIGS. 6 and 7 and a third embodiment of rear transaxle 9 shown in FIG. 8 will now be described. However, description of portions and components designated by the same reference numerals shown in FIGS. 2 to 4 is omitted because they have the same functions as those in the first embodiment of transaxle 9 shown in FIGS. 2 to 5.

Only distinctive points of the second and third embodiments from the first embodiment will be described as follows. In each of the second and third embodiments, in reduction casing 17, cylindrical wall 40 with bearing wall 40a is formed with no scraper chamber 60 opened to face the front end of axle-connection sleeve 15c, but instead each of the second and third embodiments has an upwardly opened vertical hole 63 or 65, respectively, which is also opened to lube inlet opening 19.

In each of the second and third embodiments, neither pick-up collar 58 nor scraper 25 exists between axle-connection sleeve 15c and cylindrical wall 40 partly formed with bearing wall 40a. Alternatively, in the second embodiment, an upwardly widened (downwardly tapered) funnel 64 is fitted downward into the top opening of vertical hole 63, and in the third embodiment, vertical hole 65 is upwardly widened (downwardly tapered) so as to have the wide top opening. Each of funnel 64 and vertical hole 65 is shaped in this way so as to collect lube 44 therein. Both the lube introduction means including vertical hole 63 and funnel 64 and the lube introduction means including upwardly widened vertical hole 65 are simple and require no complicated additional member, so as to save the number of parts and costs and facilitate maintenance, in comparison with the first embodiment using scraper 25 and pick-up collar 58.

In each of the second and third embodiments, during rotation of axle-driving shaft 15, large bevel gear 32 carries lube 44 stuck on the outer surface thereof into funnel 64 or the wide top portion of hole 65, so as to collect lube 44 therein and introduce lube 44 into brake lube passage 18 through hole 63 or the lower portion of hole 65 and lube inlet opening 19. In this regard, in each of the second and third embodiments, the fuel surface of fuel sump 24, into which a lower portion of large bevel gear 32 is submerged, can be lower than the fuel surface of fuel sump 24 of the first embodiment, into which the lower portion of pick-up collar 58 is submerged, because the lower portion of large bevel gear 32 is lower than the lower portion of pick-up collar 58. Namely, in comparison with the first embodiment of transaxle 9, each of the second and third embodiments of transaxle 9 can be supplied with less lube 44 so as to reduce power loss, while efficiently supplying lube 44 to brake 12.

Incidentally, in the third embodiment, an upwardly opened lube-supplying hole 66 is formed in a top wall of reduction casing 17 (main casing 33 or side cover 34) so as to be opened to the inside space of reduction casing 17, and normally plugged with a plug 67. Hole 66 is vertically separated from hole 65, however, and is disposed coaxially to hole 65. Therefore, when plug 67 is removed from hole 66 and lube 44 is supplied into hole 66 from the outside of transaxle 9, lube 44 naturally falls from hole 66 into hole 65, so as to be supplied to brake 12 through brake lube passage 18, thereby ensuring the effect of lubricating and cooling brake 12.

A fourth embodiment of transaxle 9 will now be described with reference to FIGS. 9 to 11. Description of portions and components designated by the same reference numerals shown in FIGS. 2 to 8 is omitted because they having the same functions as those in each of the above-mentioned first to third embodiments of transaxle 9.

Brake 12 in transaxle 9 of the fourth embodiment is substantially the same as fore-and-aft reversed brake 12 in transaxle 9 of the first embodiment. In this regard, a brake actuator 116 is disposed at the rear end of brake 12. That is, rotary cam plate 49 is disposed behind the alignment of rotatable friction disks 22 and unrotatable friction rings 23, and a front end surface of cylindrical wall 41 of main casing 33 serves as a cam face portion 44 facing the rear surface of rotary cam plate 49. Ball grooves 49a are formed on the rear surface of rotary cam plate 49, similar to those of rotary cam plate 49 of the first embodiment, and ball grooves 44a are formed in cam face portion 44 so as to correspond to respective ball grooves 49a. Each of balls 50 is slidably fitted between each couple of mutually corresponding ball grooves 44a and 49a.

A front cover 105 is fastened to the opened front end of front portion 33a of main casing 33 by bolts 46, so as to house a trochoidal pump 101 disposed in front of brake 12. Brake operation lever 53 is fitted on the outer end of brake operation shaft 51, and brake operation shaft 51 is rotatably supported at front and rear portions thereof by front cover 105 and front portion 33a of main casing 33 so as to be operatively connected to rotary cam plate 49 through arms 52 and 49b.

Input shaft 11 is journalled at front, fore-and-aft intermediate, and rear portions thereof through respective bearings by front cover 105, cylindrical wall 41 in front portion 33a of main casing 33, and bearing wall 40a in rear portion 33b of main casing 33, respectively, similar to that of the first to third embodiments. A brake lube passage 120 is bored within input shaft 11 along the axial centerline of input shaft 11. Brake lube passage 120 is not extended rearward to be opened at the rear end of input shaft 11, but extended forward to be opened at the front end of input shaft 11. The front opening of brake lube passage 120 is used for supplying lube into transaxle 9 from the outside of transaxle 9, and is normally plugged. Input shaft 11 are formed at the fore-and-aft intermediate portion thereof with delivery openings 20 and radial lube delivery passages 59 extended from brake lube passage 120, similar to those in each of the first to third embodiments.

Front cover 105 incorporates trochoidal pump 101 serving as lube introduction means for introducing lube 44 into brake lube passage 120. Pump 101 includes a pump housing 125 fastened with a vertical flat plate 131 to a vertical inside surface of a front wall of front cover 105 by bolts. Pump housing 125 has a forwardly opened recess facing plate 131, and an inner rotor 123 and an outer rotor 124 are rotatably disposed in the recess of pump housing 125, so as to constitute trochoidal pump 101. Inner rotor 123 surrounded by outer rotor 124 is fixed on input shaft 11, so that input shaft 11 also serves as a drive shaft of trochoidal pump 101. Alternatively, a circumscribed gear pump or another pump may be disposed in brake housing 16 so as to serve as the lube introduction means for introducing lube into brake lube passage 120.

The rear surface of pump housing 125 serves as a pressure receiving surface facing foremost friction ring 23. When brake operation lever 53 is operated for braking, rotary cam plate 49 is rotated and pushed forward by balls 50, so that friction disks 22 and rings 23 are pressed against one another between cam plate 49 and pump housing 125. Guide pin 57 with release spring 56 is disposed between foremost and rearmost friction rings 23 so as to forcibly separate disks 22 and rings 23 from one another during unbraking operation, similar to those in the first embodiment.

Figure 9:
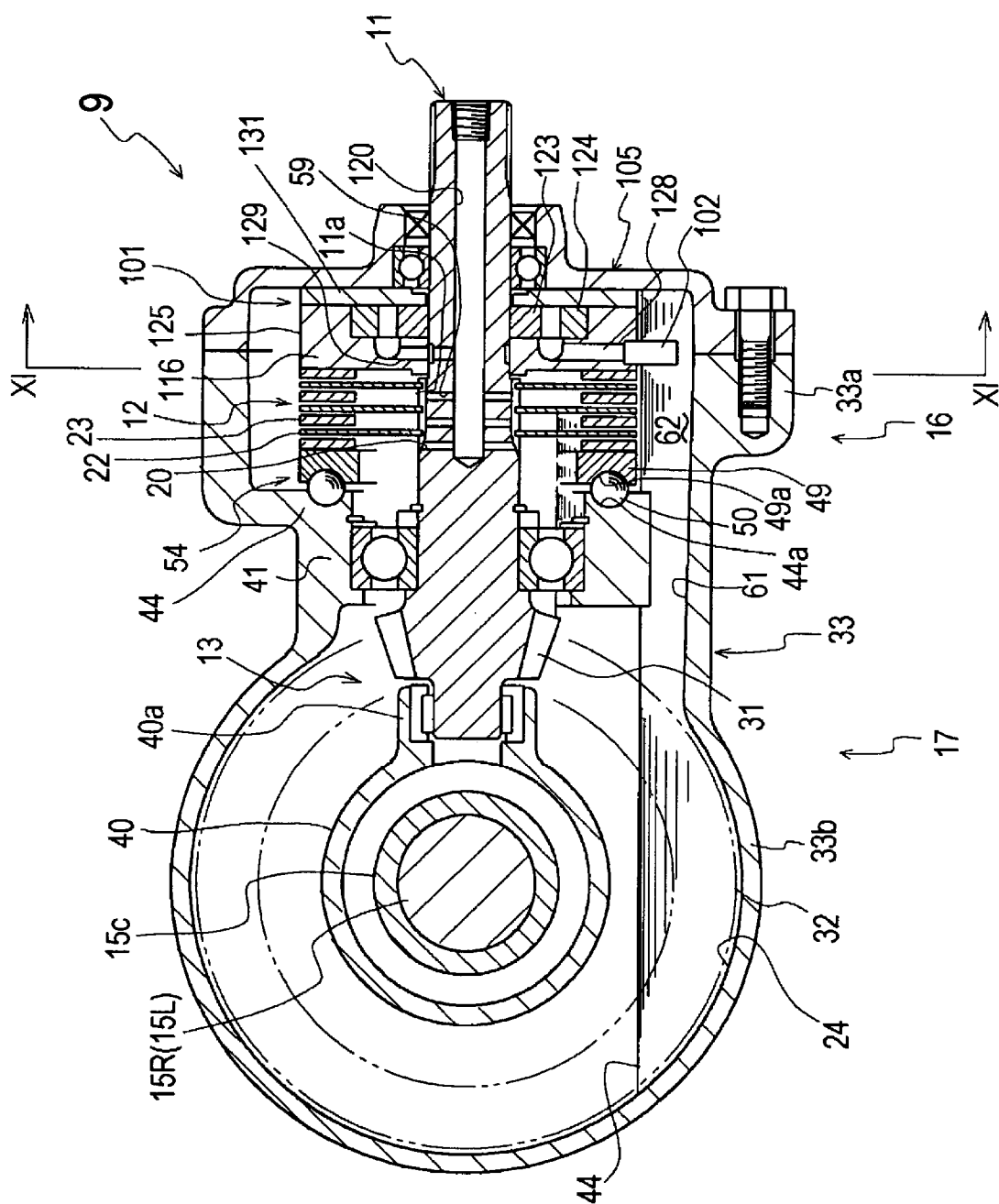
FIG. 9 is a sectional side view of a transaxle, serving as a rear transaxle for the vehicle of FIG. 1, according to a fourth embodiment of the invention.
Figure 10:
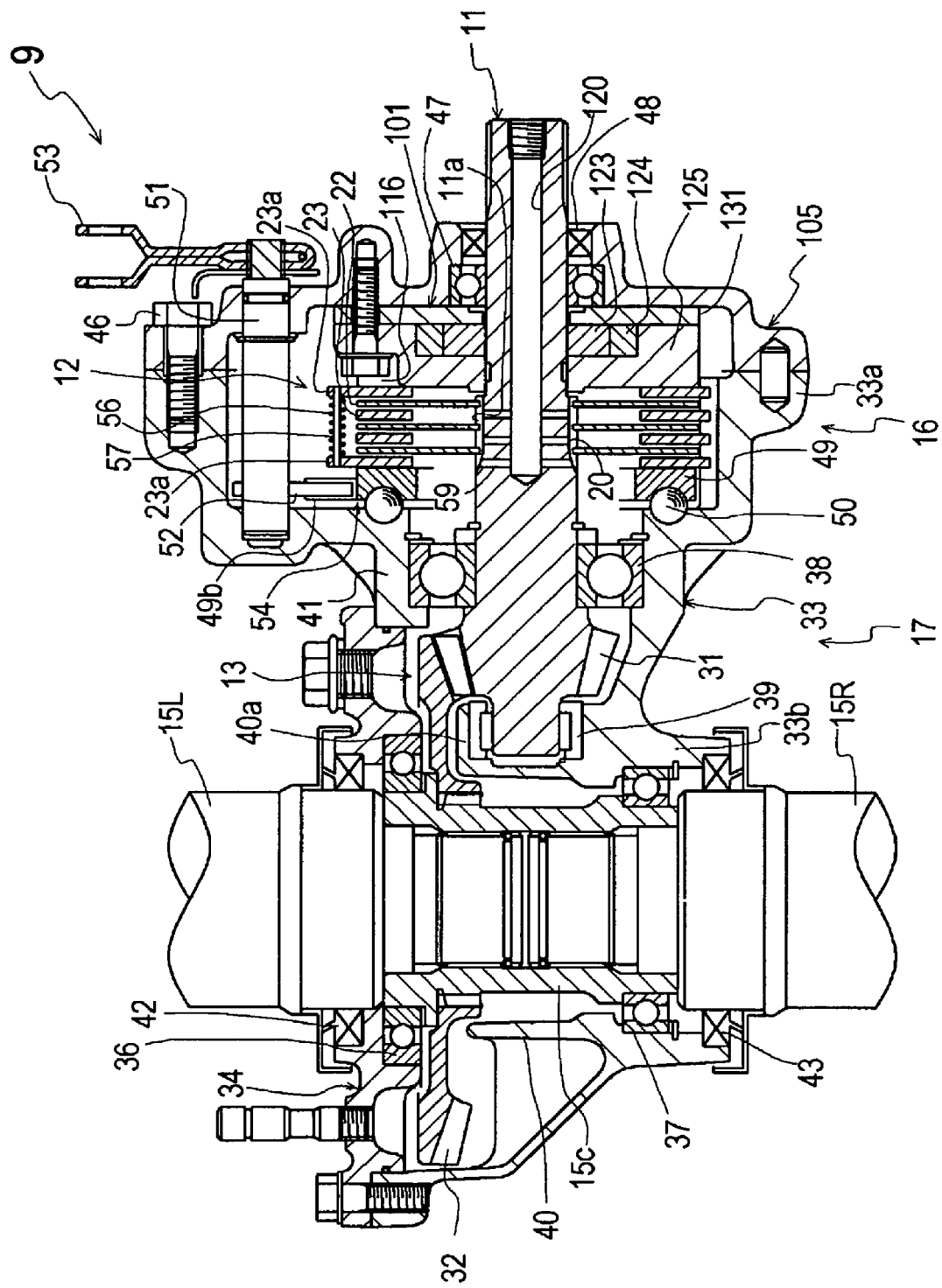
FIG. 10 is a sectional plan view of the transaxle of FIG. 9.
Figure 11:
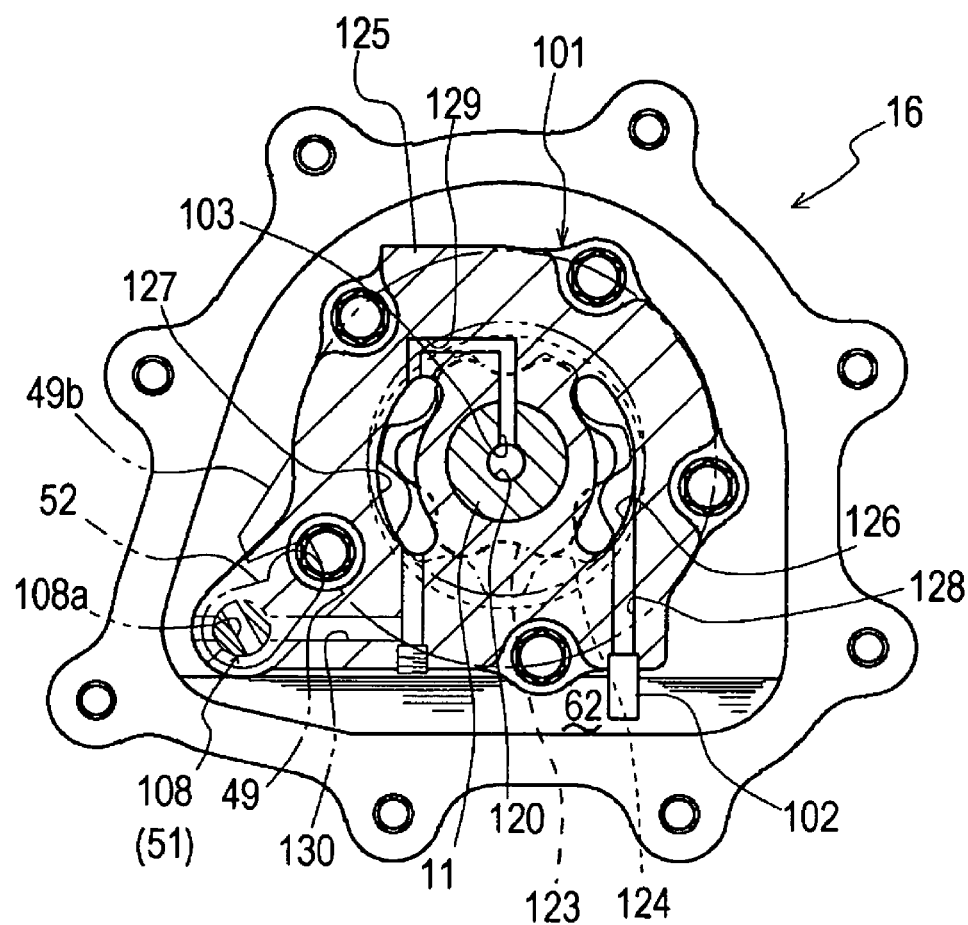
FIG. 11 is a cross sectional view taken along XI-XI line of FIG. 9.

As shown in FIGS. 9 and 11, pump housing 125 is bored with a suction port 126 and a delivery port 127 opened to the recess incorporating rotors 123 and 124. A vertical suction lube passage 128 is bored within pump housing 125 so as to be extended downward from suction port 126 and opened downward at the bottom of pump housing 125. Lower space 62 below brake 12 is ensured in brake housing 16 in this embodiment, and lube 44 flowing from fluid sump 24 in reduction casing 17 is supplied into space 62 through connection lube passage 61, so as to make a lube sump in space 62, in which the level of the lube sump in space 62 is disposed just below brake 12. An inlet pipe 102 is fitted into the bottom opening of suction lube passage 128 and extended downward so as to be submerged in lube 44 accumulated in space 62. Inlet pipe 102 may be made into an oil filter.

As shown in FIG. 11, in pump housing 125, a delivery lube passage 129 is extended upward from delivery port 127, bent horizontally, and bent downward (consequently, delivery lube passage 129 is vertically reversed U-like shaped), so as to be opened to an annular groove, which is formed on an outer peripheral surface of input shaft 11 and connected to axial brake lube passage 120 through a radial hole 103 in input shaft 11.

Further, a leak passage 130 is bored in pump housing 125 so as to be extended downward (below delivery lube passage 129) from delivery port 127 and bent horizontally so as to be opened sidewise adjacent to the surface of the lube sump in space 62. A leak valve 108 made of brake operation shaft 51 is disposed so as to cross the horizontal portion of leak passage 130. Leak valve 108 includes a diametrical hole 108a bored in brake operation shaft 51. Such a simple leak valve 108 serves as delivery control means for limiting delivery of lube to brake 12 only during activation of brake 12.

When brake operation lever 53 and brake operation shaft 51 are disposed at the unbraking position, i.e., while vehicle 1 travels normally without braking, diametrical hole 108a is disposed coaxially to the horizontal portion of leak passage 130, i.e., leak valve 108 is opened, so as to make whole leak passage 130 between delivery port 127 and the sidewise opening at the outer surface of pump housing 125. Therefore, pump 101 delivers lube 44 in delivery port 127 not to delivery lube passage 129 but to leak passage 130, and drains it to the lube sump in space 62, thereby stopping delivery of lube to brake 12.

When brake operation lever 53 and brake operation shaft 51 are disposed at the braking position, i.e., when traveling vehicle 1 is braked, diametrical hole 108a is disposed slantwise from the coaxial position to the horizontal portion of leak passage 130, i.e., leak valve 108 is closed, so as to cut off leak passage 130 between delivery port 127 and the sidewise opening at the outer surface of pump housing 125. Therefore, pump 101 delivers lube 44 in delivery port 127 not to leak passage 130 but to brake lube passage 120 through delivery lube passage 129 and radial hole 103 in input shaft 11, thereby forcibly delivering lube 44 radially from delivery openings 20 to brake 12 including friction disks 22 and rings 23 which are pressed against one another during the braking.

Therefore, during travel of vehicle 1, input shaft 11 is rotated, so that trochoidal pump 101 sucks lube 44 into suction port 126 from the lube sump in space 62 (the lower portion of brake housing 16) through inlet pipe 102 submerged in lube 44 in space 62 and suction lube passage 128. Unless brake 12 is operated for braking (during inactivation of brake 12), leak valve 108 is opened to drain lube 44 delivered from pump 101, so as to prevent the delivery of lube 44 from delivery openings 20 to brake 12 including high-speed rotating friction disks 22, thereby preventing agitation of the lube sump by brake 12 (by rotating friction disks 22) causing power loss and heat.

On the other hand, when brake 12 is activated (operated for braking) during travel of vehicle 1, pump 101 forcibly delivers lube 44 from delivery openings 20 to rotating friction disks 22 and stationary friction rings 23 frictionally pressed against one another, thereby sufficiently cooling disks 22 and rings 23. Even if the level of lube sump 24 is low (the quantity of lube 44 is small) and even if traveling vehicle 1 is tilted so as to tilt the surface of lube sump in brake housing 16 and reduction casing 17, sufficient delivery of lube to brake 12 is stably ensured because pump 101 sucks lube 44 from the lube sump in space 62 through inlet pipe 102 extended downward deeply into the lube sump. Conversely, since the level of lube sump is low so as to be disposed below brake 12, friction disks 22 rotating at high speed during traveling of vehicle 1 are prevented from agitating the lube accumulated in space 62, thereby reducing power loss and heat caused by agitation of the lube.

In other words, pump 101 serves as the lube introduction means for supplying brake lube passage 120 with lube from a low position, and leak valve 108 serves as the delivery control means for preventing the lube introduction to brake lube passage 120 while vehicle 1 travels during inactivation of brake 12, i.e., for limiting delivery of lube from pump 101 to brake 12 only during activation of brake 12, thereby cooperatively effecting lowering of the lube level (reduction of the quantity of lube) for preventing power loss and heat caused by resistance of lube against the agitation.

Figure 12:
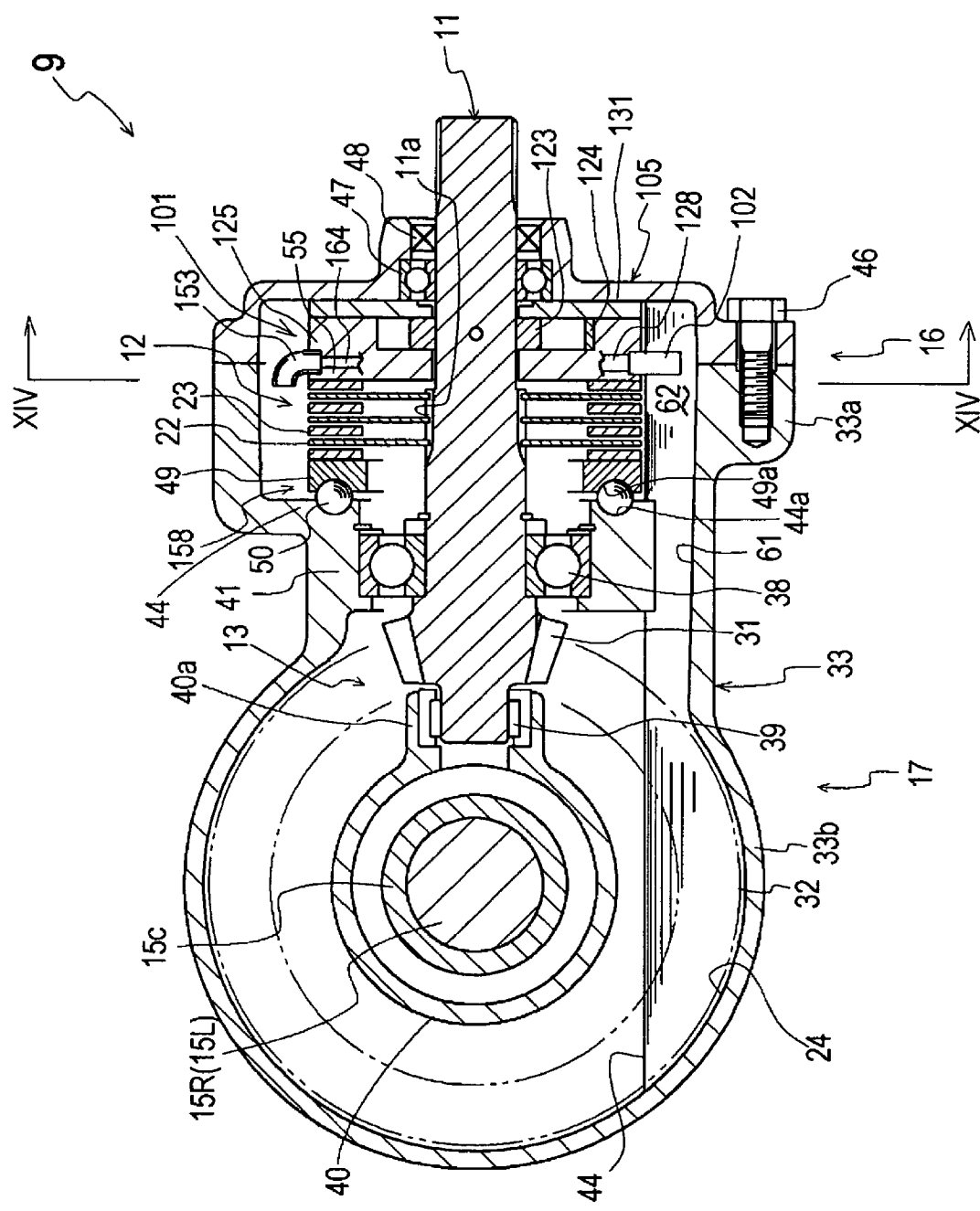
FIG. 12 is a sectional side view of a transaxle, serving as a rear transaxle for the vehicle of FIG. 1, according to a fifth embodiment of the invention.
Figure 13:
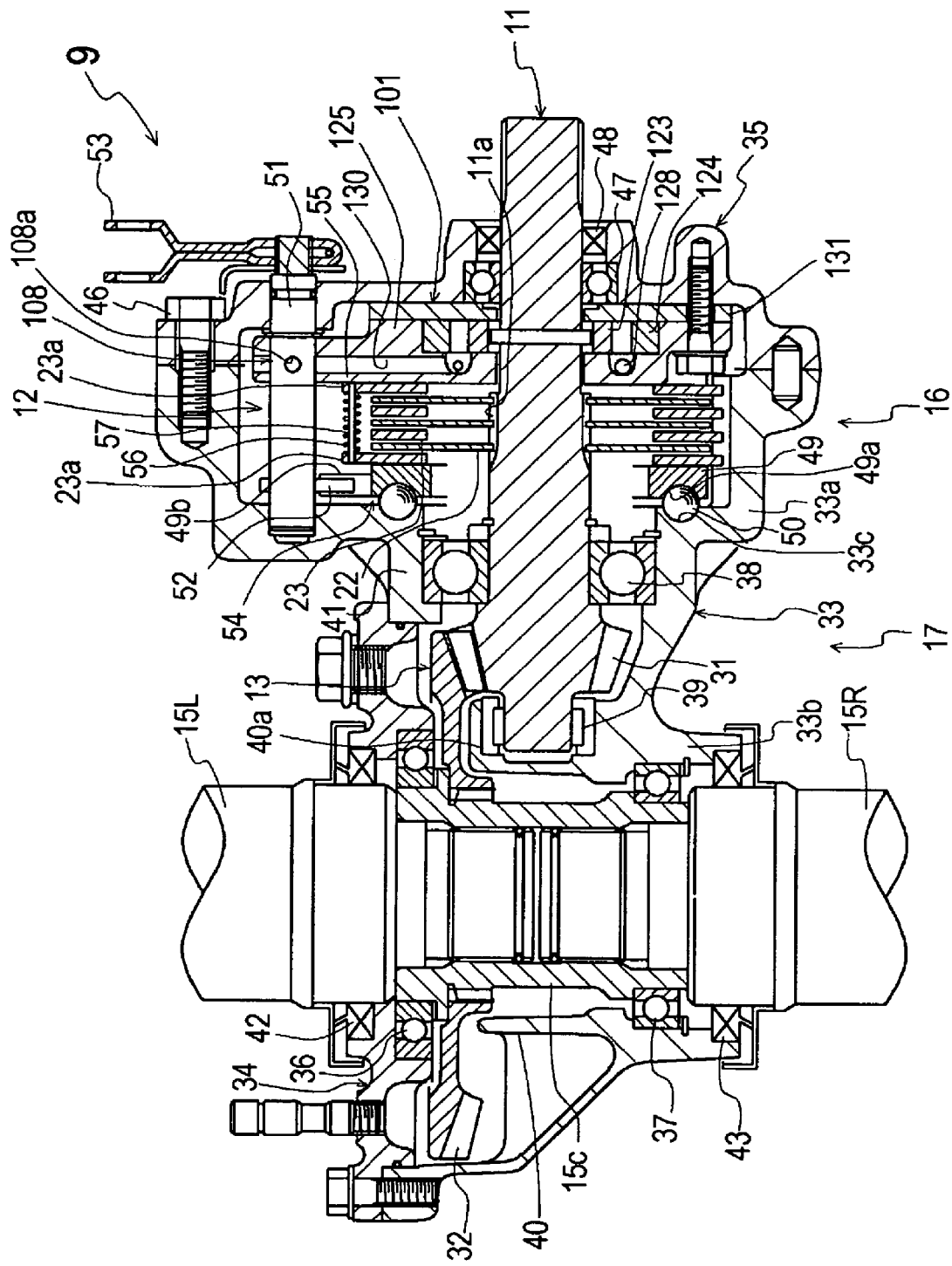
FIG. 13 is a sectional plan view of the transaxle of FIG. 12.
Figure 14:
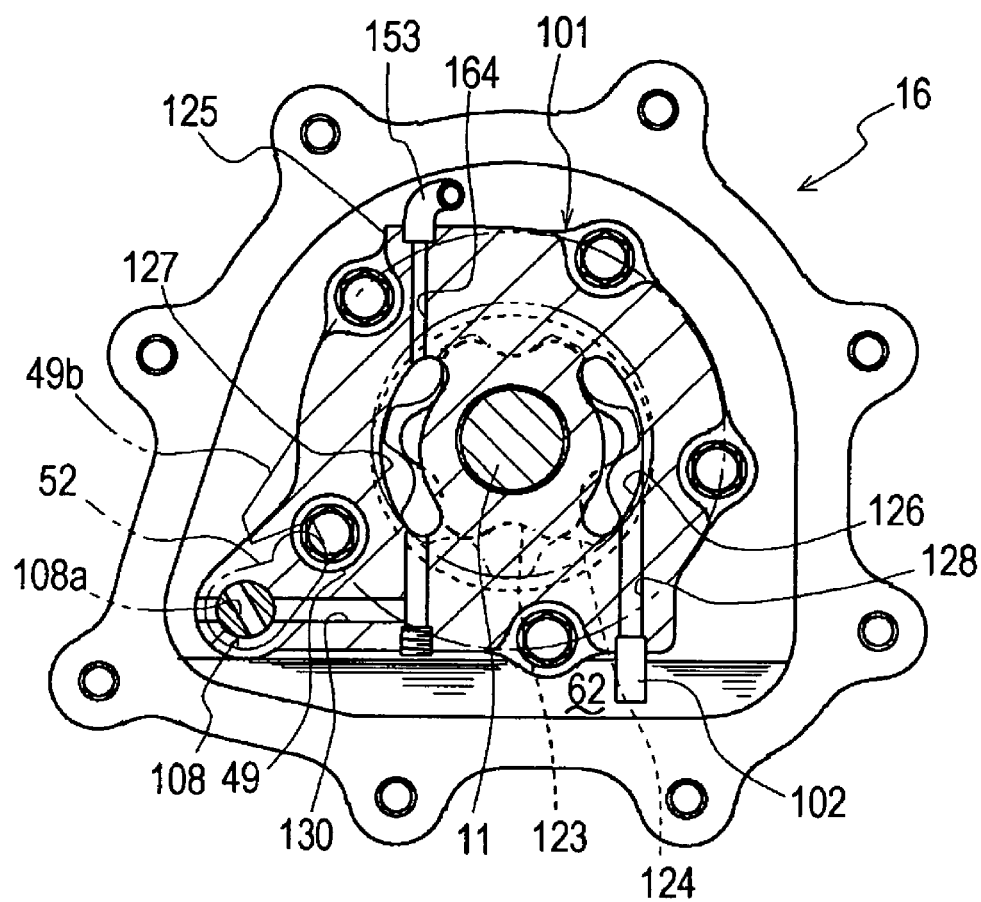
FIG. 14 is a cross sectional view taken along XIV-XIV line of FIG. 12.

A fifth embodiment of transaxle 9 will now be described with reference to FIGS. 12 to 14. However, description of portions and components designated by the same reference numerals shown in FIGS. 9 to 11 is omitted because they have the same functions as those in the fourth embodiment of transaxle 9 shown in FIGS. 9 to 11.

Only distinctive points of the fifth embodiment from the fourth embodiment will be described as follows. Similar trochoidal pump 101 serves as an upwardly pumping pump, which pumps lube 44 upward from the lube sump in lower space 62 in brake housing 16. With respect to the distinctive point of pump 101 of this embodiment from that of the fourth embodiment, a vertical delivery lube passage 164 is extended upward from delivery port 127 and opened upward at the top of pump housing 125, instead of vertically reversed U-like delivery lube passage 129. A bent delivery pipe 153 is fitted into the top opening of delivery lube passage 164, extended outward and bent horizontally toward the top of brake 12. In this regard, input shaft 11 is provided therein with no lube passage, no lube inlet opening and no lube outlet opening. That is, in this embodiment, vertically pumping pump 101 serves as lube delivery means for delivering lube 44 from delivery pipe 153 disposed above brake 12 to the top of brake 12, so that delivered lube 44 falls downward along friction disks 22 and friction rings 23 so as to be spread over the whole brake 12, instead of the centrifugal delivery of lube 44 to brake 12 from input shaft 11 around which brake 12 is provided.

Similar leak valve 108 is provided in pump housing 125, so as to serve as delivery control means for limiting the delivery of lube from pump 101 to brake 12 only during activation of brake 12. In this way, pump 101 and leak valve 108 function similar to those in the fourth embodiment, so as to effect lowering of the lube level (reduction of the quantity of lube) for preventing power loss and heat caused by resistance of lube against the agitation.

Figure 15:
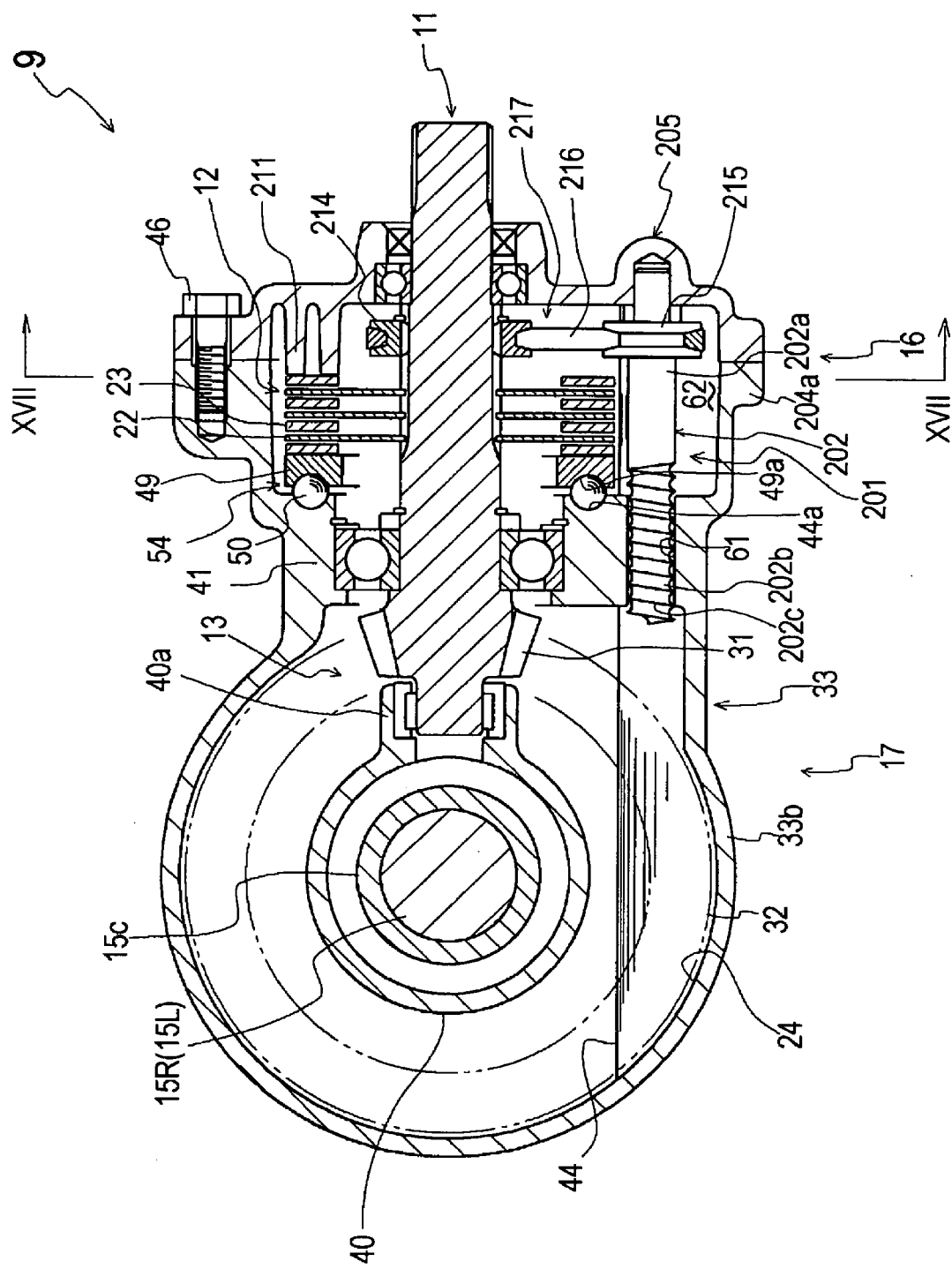
FIG. 15 is a sectional side view of a transaxle, serving as a rear transaxle for the vehicle of FIG. 1, according to a sixth embodiment of the invention.

A sixth embodiment of transaxle 9 will now be described with reference to FIGS. 15 to 17. However, description of portions and components designated by the same reference numerals shown in FIGS. 9 to 11 is omitted because they have the same functions as those in the fourth embodiment of transaxle 9 shown in FIGS. 9 to 11. Only distinctive points of the sixth embodiment from the fourth embodiment will be described as follows.

To constitute brake housing 16, a front cover 205 is fastened to the opened front end of main casing 33 by bolts 46. A rearward extended wall 211 serves as the pressure receiving portion facing foremost friction ring 23.

Instead of upwardly pumping pump 101, horizontally pumping pump 201 is disposed in the fore-and-aft direction in transaxle 9. Pump 201 includes a horizontal pump shaft 202. A front portion 202a of pump shaft 202 is submerged in the lube sump in space 62 below brake 12 in pump housing 16, and its front end is rotatably supported by a front wall of front cover 205. A rear portion 202b of pump shaft 202 is rotatably passed through connection lube passage 61 between reduction casing 17 and brake housing 16, and threaded on the peripheral surface thereof so as to serve as an auger portion 202c.

In brake housing 16, a pulley 214 is fixed on input shaft 11, a pulley 215 is fixed on front portion 202a of pump shaft 202, and a belt 216 is interposed between pulleys 214 and 215 so as to transmit rotation of input shaft 11 to pump shaft 202. When pump shaft 202 is rotated, auger 202c sends lube 44 from lube sump 24 in reduction casing 17 into space 62 in brake housing 16, thereby permeating lube into the lower portion of brake 12.

Figure 16:
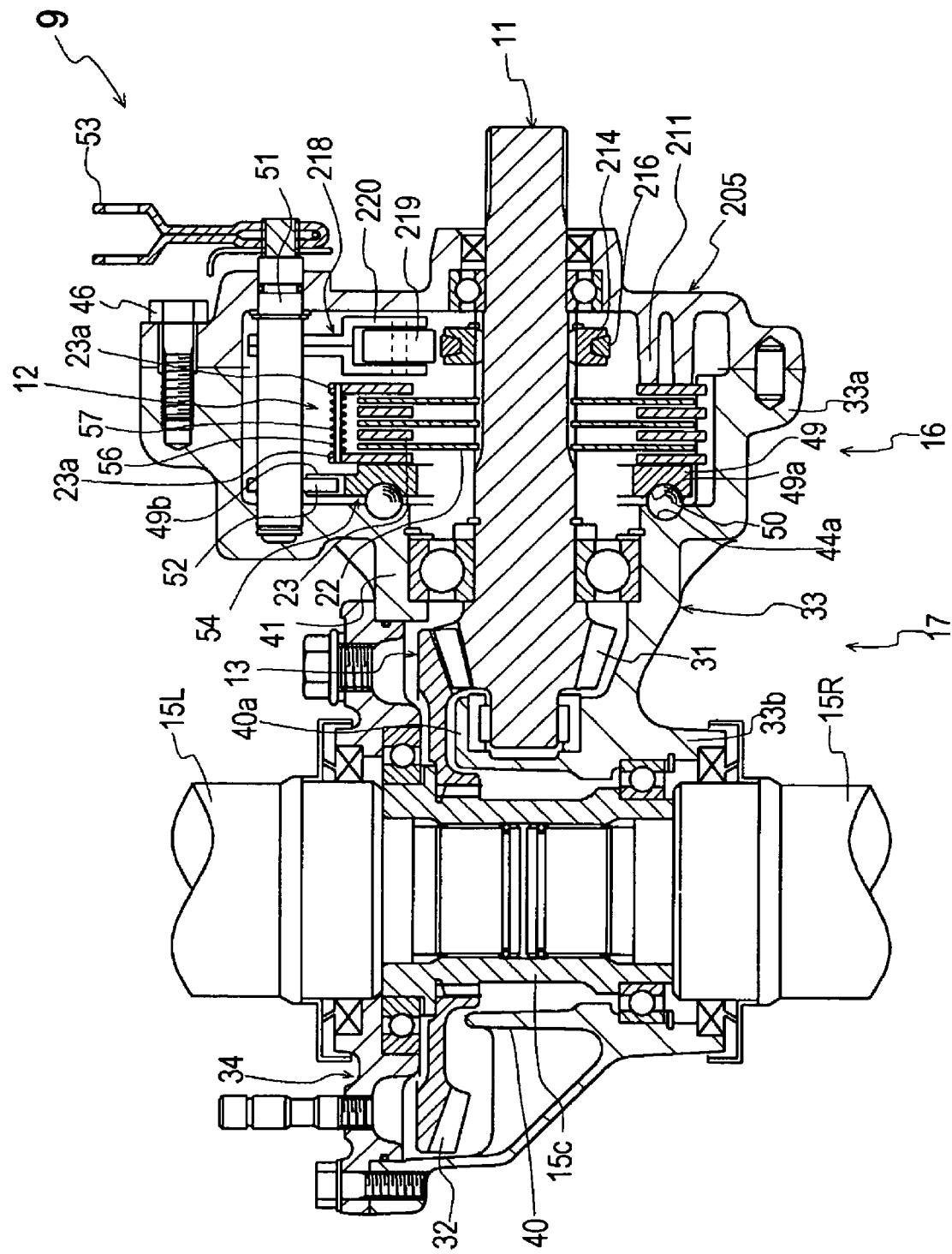
FIG. 16 is a sectional plan view of the transaxle of FIG. 15.
Figure 17:
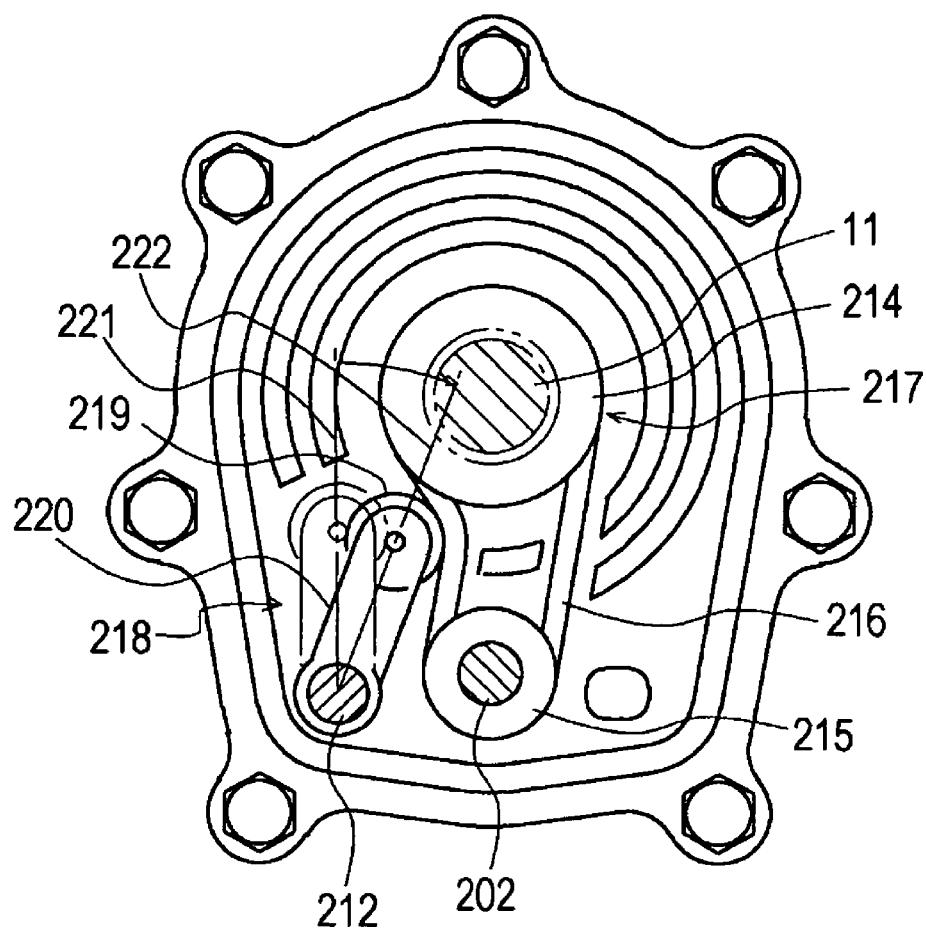
FIG. 17 is a cross sectional view taken along XVII-XVII line of FIG. 15.

Further, as shown in FIG. 16, a tension clutch 218 serves as delivery control means for limiting delivery of lube from pump 201 only during activation of brake 12. In this regard, a tension clutch roller 219 is pivoted on a clutch bracket 220 fixed on brake operation shaft 51. While brake operation shaft 51 is disposed at the unbraking (inactivation) position, tension clutch 218 is disposed to loose belt 216 so as to isolate pump shaft 202 from rotation of input shaft 11, thereby preventing pump 201 from pumping lube for supplying lube to brake 12. When brake operation shaft 51 is disposed at the braking (activation) position, tension clutch 218 is disposed to tighten belt 216 so as to rotate pump shaft 202 by the rotation of input shaft 11, so that auger 202c rotates to send lube 44 from lube sump 24 in reduction casing 17 into space 62 in brake housing 16, thereby permeating lube into the lower portion of brake 12. Consequently, the level of lube sump in space 62 gradually rises with the progress of the braking, so that, as brake 12 is heated, lube for cooling brake 12 is increased.

As mentioned above, in this embodiment, pump 201 serves as the lube delivery means for horizontally sending lube to be supplied to brake 12, and leak valve 108 serves as the delivery control means for preventing the lube delivery to brake 12 while vehicle 1 travels during inactivation of brake 12, i.e., for limiting delivery of lube from pump 201 to brake 12 only during activation of brake 12, thereby cooperatively effecting lowering of the lube level (reduction of the quantity of lube) for preventing power loss and heat caused by resistance of lube against the agitation.

It is further understood by those skilled in the art that the foregoing description is a preferred embodiment of the disclosed apparatus and that various changes and modifications may be made in the invention without departing from the spirit and scope thereof defined by the following claims.

What is claimed is:

1. A transaxle comprising:
    a casing having a reduction chamber and a brake chamber therein, and formed with a cylindrical wall in the reduction chamber;
    an axle journalled by the casing and surrounded by the cylindrical wall of the casing;
    an input shaft journalled by the casing and extended through the brake chamber and perpendicular to the axle, wherein the input shaft includes:
        an axially distal end surface disposed outside of the casing so as to be drivingly connected to a prime mover;
        an axially proximal end surface disposed in the cylindrical wall so as to face the axle; and
        an outer peripheral side surface between the axially distal and proximal end surfaces;
    a brake disposed in the brake chamber and around the outer peripheral side surface of the input shaft so as to be operated to brake the input shaft;
    a reduction drive train disposed in the reduction chamber and drivingly interposed between the input shaft and the axle, the reduction drive train including first and second bevel gears meshing with each other, wherein the first bevel gear is provided on the outer peripheral side surface of the input shaft, and wherein the second bevel gear is provided around the axle outside of the cylindrical wall so as to be rotatable integrally with the axle;
    a lube sump provided in the casing;
    a delivery opening opened at the outer peripheral side surface of the input shaft and facing the brake so as to deliver lube to the brake; and
    a brake lube passage extended axially in the input shaft and connected at one axial end thereof to the delivery opening, wherein:
    the brake lube passage includes a lube inlet opening at the other axial end thereof,
    the lube inlet opening is provided at the axial proximal end surface of the input shaft, and
    lube is supplied from the lube sump to the brake lube passage via cylindrical wall and the lube inlet opening so as to flow from the lube inlet opening to the delivery opening via the brake lube passage.

2. The transaxle according to claim 1, further comprising:
a vent hole formed in the casing so as to connect upper portions of the brake chamber and the reduction chamber to each other.

3. The transaxle according to claim 1, further comprising:
a rotary component member provided around the axle so as to be rotatable integrally with the axle, and surrounded by the cylindrical wall; and
a scraper disposed in the cylindrical wall and interposed between the lube inlet opening and the rotary component member so as to scrape lube stuck on an outer peripheral side surface of the rotating rotary component member and to introduce the scraped lube into the brake lube passage through the lube inlet opening.

4. The transaxle according to claim 1, further comprising:
an upwardly opened lube collection portion disposed in the cylindrical wall and opened to the reduction chamber and to the lube inlet opening so as to supply lube from the lube sump via the lube inlet opening to the brake lube passage.

* * * * *